United States Patent [19]

Faroudja et al.

[11] Patent Number: 5,488,422
[45] Date of Patent: Jan. 30, 1996

[54] VIDEO SCAN CONVERTER INCLUDING THE MODIFICATION OF SPATIALLY INTERPOLATED PIXELS AS A FUNCTION OF TEMPORAL DETAIL AND MOTION

[75] Inventors: Yves C. Faroudja, 26595 Anacapa Dr., Los Altos Hills, Calif. 94022; Charles A. Bialo, San Jose, Calif.

[73] Assignee: Yves C. Faroudja, Los Altos Hills, Calif.

[21] Appl. No.: 261,481

[22] Filed: Jun. 17, 1994

Related U.S. Application Data

[63] Continuation-in-part of Ser. No. 954,382, Sep. 30, 1992, Pat. No. 5,347,314, which is a continuation-in-part of Ser. No. 671,478, Mar. 19, 1991, Pat. No. 5,159,451.

[51] Int. Cl.⁶ .................. H04N 7/01; H04N 7/12
[52] U.S. Cl. ............. 348/448; 348/439; 348/459
[58] Field of Search ..................... 348/439, 448, 348/459; H04N 7/01, 7/12

[56] References Cited

U.S. PATENT DOCUMENTS 4,791,487  12/1988  Kozuki et al. .................. 348/448
4,987,489  1/1991   Hurley et al. ................... 358/105
4,989,090  1/1991   Campbell et al. ............... 348/448
5,032,899  7/1991   Sato .............................. 348/459
5,181,110  1/1993   Katsumata et al. .............. 358/140

*Primary Examiner*—James J. Groody
*Assistant Examiner*—Glenton B. Burgess
*Attorney, Agent, or Firm*—Thomas A. Gallagher

[57] ABSTRACT

A video scan converter includes an input for receiving a video signal at a first scan rate, an output for providing a video signal at a second scan rate and a main path leading between the input and the output. The main path includes a scan line interpolation circuit and a time scale modification circuit which provide conventional two-dimensional scan conversion. A further path coupled to the main path dynamically alters the output of the scan line interpolation circuit in response to motion in the picture represented by the video signal, thus providing a three-dimensional scan conversion. The further path may be optional.

9 Claims, 13 Drawing Sheets

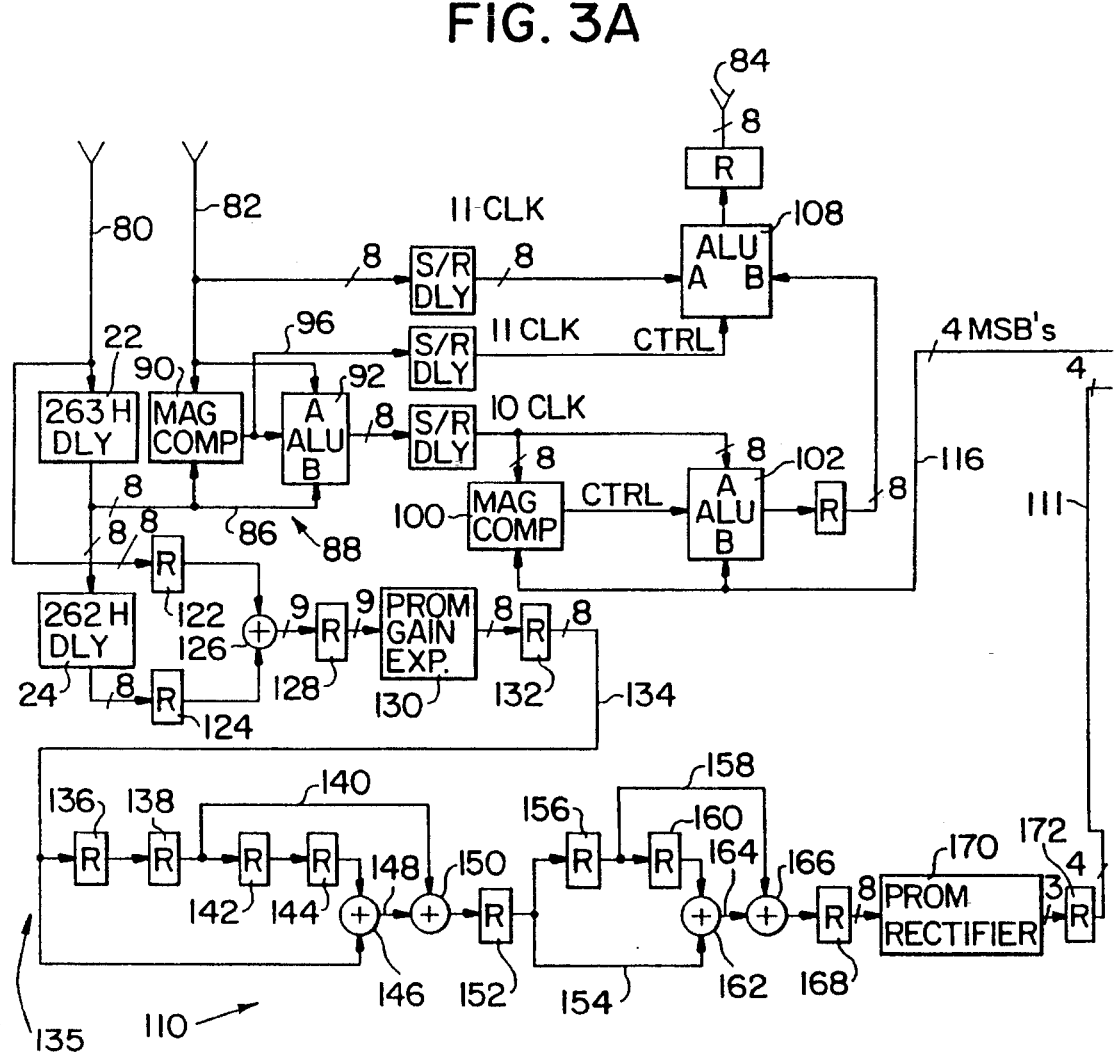

FIG. 7
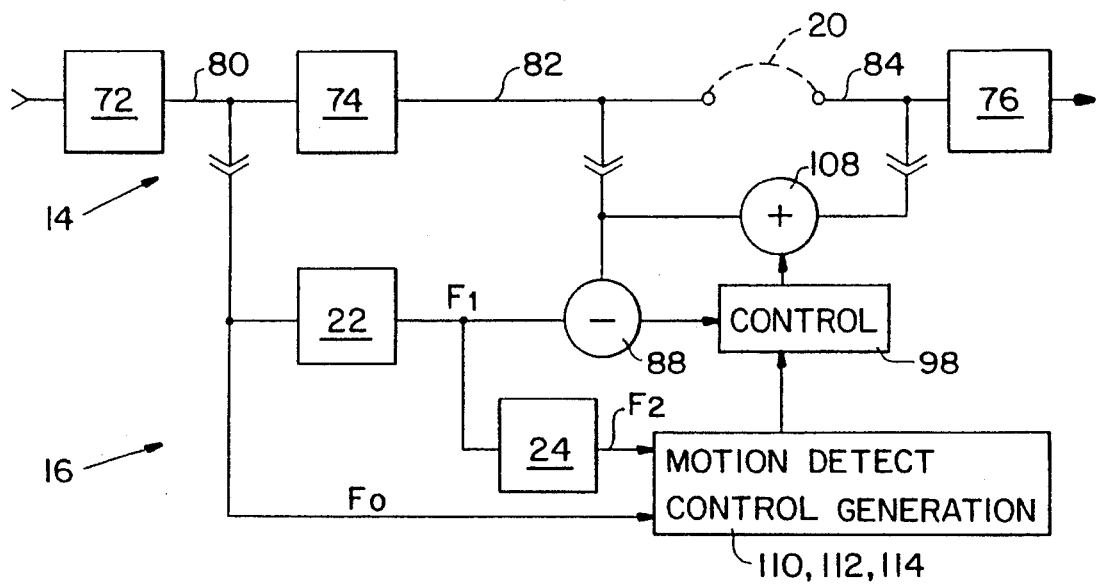
FIG. 8A
(NO MOTION)
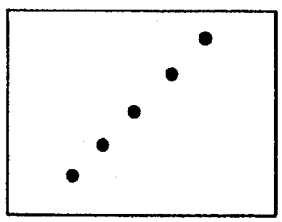
FIG. 8B
(MOTION)
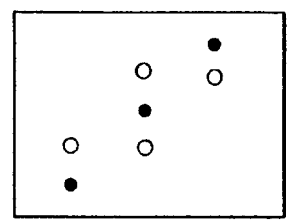
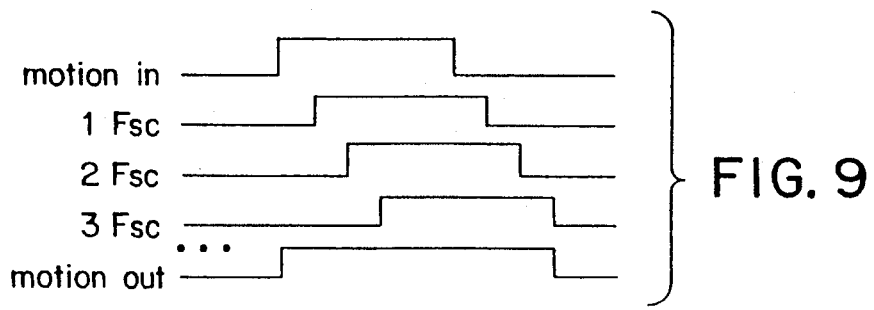
FIG. 9

Vertical Domain

Time Domain

VIDEO SCAN CONVERTER INCLUDING THE MODIFICATION OF SPATIALLY INTERPOLATED PIXELS AS A FUNCTION OF TEMPORAL DETAIL AND MOTION

CROSS-REFERENCE TO RELATED APPLICATION

This application is a continuation-in-part of our parent application Ser. No. 07/954,382, filed Sep. 30, 1992, now U.S. Pat. No. 5,347,314, which is in turn a continuation-in-part of application Ser. No. 7/671,478, filed Mar. 19, 1991, now U.S. Pat. No. 5,159,451.

FIELD OF THE INVENTION

The invention relates to video signal processing. More particularly, the invention relates to an expansible video scan converter enabling a very low cost limited performance two-dimensional line doubler to be enhanced to a three-dimensional line doubler with increased performance, merely by adding an optional circuit to the doubler. The invention also relates to a two-path video scan converter having a conventional two-dimensional (horizontal and vertical domains) main path and a further path which dynamically alters signal components in the main path in order to provide three dimensional (horizontal, vertical and temporal domains) scan conversion.

BACKGROUND OF THE INVENTION

Video monitors (such as for use with computers) and television receivers are available in a wide variety of sizes and capabilities, including picture quality. As picture quality and/or picture display size increases, the cost of the monitor or receiver increases. While there are some portions of a monitor or receiver which are essential to detect and decode the picture for display and, in the case of a television receiver, separate the sound for reproduction, there are other portions of the receiver or monitor (herein referred to as a "decoder") which, if present, enhance overall performance thereof.

It is therefore most useful to provide a decoder for a monitor or receiver which is comprised of plural modules, at least some of which are entirely optional to satisfactory picture display. In one minimum, very inexpensive configuration, for example, the decoder may include just enough signal processing equipment to provide a minimum, yet adequate picture quality. Such a decoder might be appropriate for a receiver or monitor having a small picture display size, such as a fourteen inch diagonal dimension. By simply adding modules to the decoder, a very high quality display would be provided for a large picture display size, such as 50 inches.

It is known that the visual appearance of a video display, particularly that of a large dimension display, is enhanced by doubling the number of horizontal scanning lines. In large dimension displays, the line scan structure becomes a visible and objectionable picture artifacts occur which distract from the aesthetic quality of the picture display. As the display format is reduced, the line scan structure becomes less objectionable, but can be seen, particularly upon high contrast, high quality displays, such as the Sony Trinitron™ display. By doubling the number of scanning lines at the receiver, the line scan structure becomes much less visible.

Scan line doubling is only one enhancement of a plurality of known enhancements which may be applied at the receiver or monitor in order to improve the quality of the picture display. Noise reduction and crispening are also known enhancements.

A scan line doubler generates additional scan lines, based upon the picture content of the original scan lines. Line averaging is one known approach. With line averaging, a new pixel is generated as an average of a pixel value at the same spatial region or area of two adjacent scan lines A and B. The resultant average pixel, typically (A+B)/2, is then placed on a new line generated in the space between the two original lines A and B.

There are known drawbacks to spatial averaging within line doublers. First, there is a loss of vertical and diagonal resolution. Second, there is a resultant flickering, which becomes very perceptible at high transitional levels, such as those above 50 IRE units. These problems are addressed and a very satisfactory solution is presented by the disclosure contained in a commonly assigned U.S. Pat. No. 4,989,090, entitled "Television Scan Line Doubler Including Temporal Median Filter", the disclosure of which is hereby incorporated by reference. A related commonly assigned patent is U.S. Pat. No. 4,867,271, bearing the same title as said '090 patent. Its disclosure is also hereby incorporated by reference. However, the scan line doubler described in the referenced U.S. Patents did not lend itself to low cost implementation for the television consumer marketplace, and the temporal dimension processing was not modularized or "optional", thereby providing no expansibility of the processing capability at the television decoder. The present invention can be considered to be a significant improvement in aspects of the approach taken in the above-referenced U.S. Patents.

SUMMARY OF THE INVENTION WITH OBJECTS

A general object of the present invention is to provide a minimum acceptable performance, two-dimensional line doubler for a receiver or monitor which may be readily expanded to a motion adaptive three-dimensional line doubler by adding an optional circuit to the two-dimensional line doubler.

Another general object of the present invention is to provide a two-dimensional line doubler for a receiver or monitor which may be expanded to a three-dimensional line doubler by adding an optional circuit to the two-dimensional line doubler, the optional circuit including field memory units.

A still further general object of the present invention is to provide an improved and circuit-simplified additive path three-dimensional line doubler including an improved control circuit implementing a variable switchover threshold for switching from field delayed spatially aligned pixels to average pixels in accordance with a threshold which varies smoothly as a function of the motion activity in the picture, thereby preserving main fine picture details when motion is slow or limited in area, and also minimizing perceptible flicker and other artifacts otherwise incident to the pixel interpolation process.

One more general object of the present invention is to provide a scan line doubler for a receiver or monitor which is modular, which provides satisfactory performance in a minimum configuration without field memory units, and which provides superior performance as a three dimensional scan line doubler when a further path including field memory units are added.

One more general object of the present invention is to provide a scan line doubler for a receiver or monitor which is modular, which provides satisfactory performance in a minimum configuration without field memory units, and which provides superior performance as a three dimensional scan line doubler when a field memory is added to the main path and a further path including a field memory unit is added.

Yet another object of the present invention is to provide a scan line doubler which is readily implemented with digital electronics in one or a few large scale integrated circuit chips, and which operates in a minimum configuration in two dimensions without digital field memory units, and which operates in an expanded configuration in three dimensions when digital field memory units are added.

In accordance with the present invention, a video scan converter is provided for a receiver or monitor. The video scan converter may be an expansible video scan converter which includes: an input for receiving a video signal at a first scan rate, an output for providing the video signal at a second scan rate, a main signal path coupling the input and the output, the main signal path including a line interpolation circuit for interpolating pixels in original scan lines of tile video signal and for putting out interpolated scan lines comprised of pixels interpolated in the spatial domain, a time scale modification circuit for combining original and interpolated scan lines into a video signal at the second scan rate, optional further path insertion points between the line interpolation means and the time scale modification circuit, and a removable connecting path bridging the optional further path insertion means. Alternatively, the optional further path insertion points may be located between the time scale modification circuit and the output. Although the two arrangements are functionally equivalent to each other, the first described arrangement is preferred because the further path must operate at a higher scanning frequency in the alternative arrangement.

The further path generates a correction signal which is coupled to the main path and combined with the line interpolated pixels put out by the line interpolation circuit. There are two extreme conditions of operation: "full" motion and "no" motion. For the case of full motion, no correction signal is combined with the main path line interpolated pixels. For the case of no motion the correction signal suppresses or cancels the main path line interpolated pixels and substitutes a signal derived from one or more other video scan sequences. For conditions between full motion and no motion, the correction signal is combined with the main path signal so as to modify the line interpolated pixels by adding and/or subtracting signal components derived from one or more other video scan sequences. The correction signal becomes progressively smaller as picture motion speed and/or amplitude of object in motion relative to background increases.

In one embodiment, the correction signal is derived from the combination of delayed pixels from a prior video scan sequence, such as one field delayed pixels in the case of a television signal, minus line interpolated pixels. The correction signal is subjected to a threshold signal which is a function of picture motion speed and/or amplitude of object in motion relative to background. The threshold signal acts to progressively reduce the effect of the correction signal as motion speed and/or amplitude of object in motion relative to background increases.

In another embodiment, the correction signal is derived from the combination of pixels from a prior and subsequent video scan sequences, such as pixels from prior and subsequent fields in the case of a television signal, minus line interpolated pixels of a field between the prior and subsequent fields. As in the other embodiment, the correction signal is subjected to a threshold signal which is a function of picture motion speed and/or amplitude of object in motion relative to background. The threshold signal acts to progressively reduce the effect of the correction signal as motion speed and/or amplitude of object in motion relative to background increases.

Another aspect of the invention is the provision of a motion picture film detector which operates a switching function in order to provide either the last described correction signal when a video signal is being processed or, alternatively, when a signal derived from a motion picture is being processed, to provide either the prior field or the subsequent field to the main path in lieu of the line interpolated pixels.

As a further related aspect of the present invention the additive path of the scan line doubler includes plural plug-in field memory units.

As another aspect of the present invention, the scan line conversion function is carried out digitally, and the scan line converter further comprises analog to digital converter circuitry connected to said input, and digital to analog converter circuitry connected to said output, and wherein said main path comprises digital electronics. In this aspect, the further path also comprises digital electronics, including plural plug-in digital field memory units.

These and other objects, advantages, aspects and features of the present invention will be more fully understood and appreciated by those skilled in the art upon consideration of the following detailed description of a preferred embodiment, presented in conjunction with the accompanying drawings.

BRIEF DESCRIPTION OF THE DRAWINGS

FIG. 1 shows the optional further path insertion means in its preferred location—between the line interpolation means and the time scale modification means.

FIG. 7 is a simplified block diagram of the FIG. 1 circuit.

FIG. 8A is a graph of a picture image display showing operational characteristics of the FIGS. 1 and 7 circuitry in the absence of motion.

FIG. 8B is a graph of a picture image display showing operational characteristics of the FIGS. 1 and 7 circuitry in the presence of motion.

FIG. 9 is a set of waveforms showing extension in the horizontal or line scan domain of a motion control signal in accordance with operation of the FIGS. 1 and 7 circuit.

FIG. 11 shows the optional further path insertion means in its preferred location—between the line interpolation means and the time scale modification means.

DETAILED DESCRIPTION OF A PREFERRED EMBODIMENTS

Figure 1:
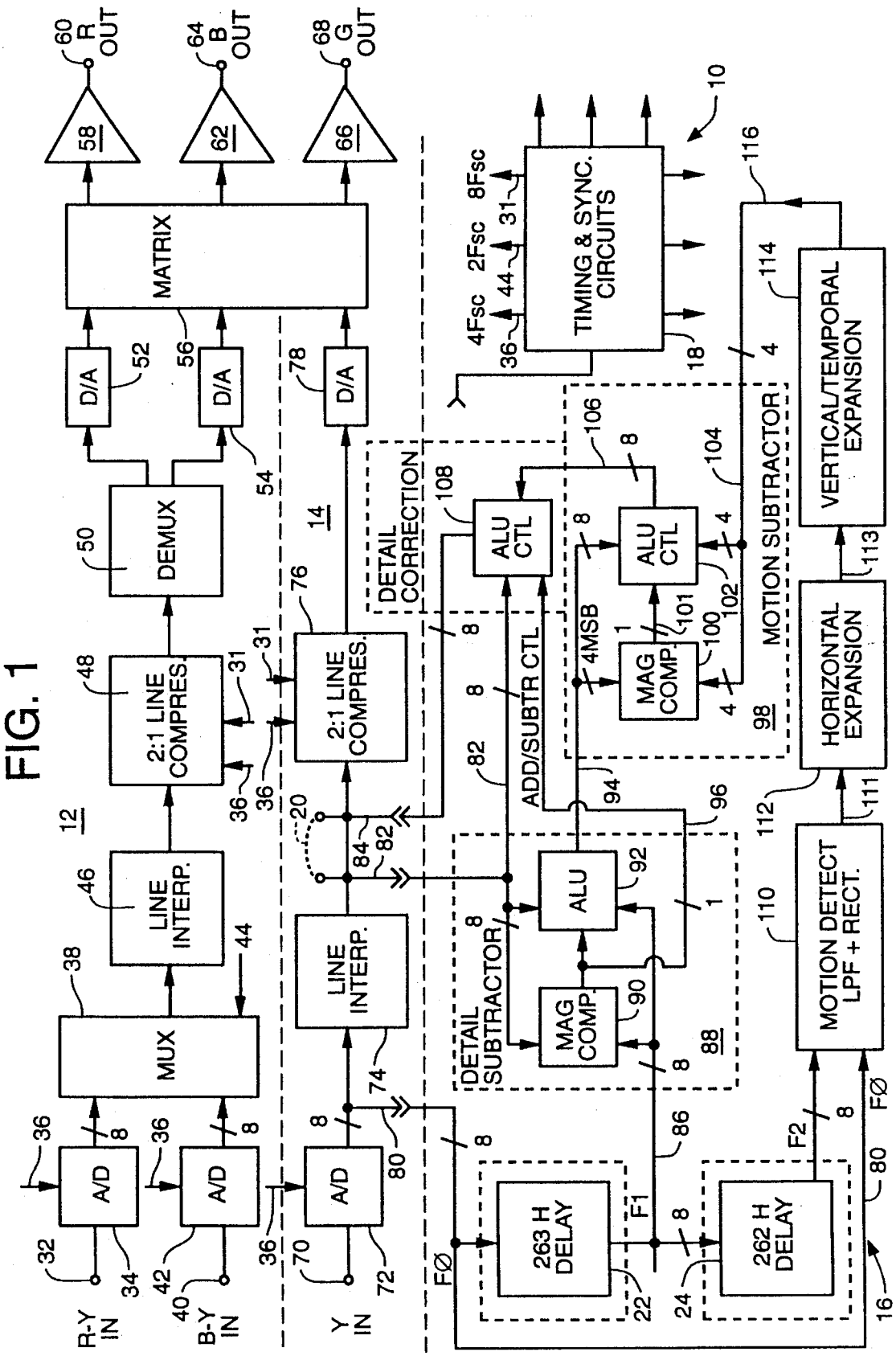
FIG. 1 is a block diagram of a modular, field memory expansible scan line doubler for a receiver or monitor in accordance with principles of the present invention.

FIG. 1 shows a preferred embodiment of the video scan converter according to the invention. Although this and other embodiments of the invention are described mainly in the context of television signals and television receiver equipment, aspects of the invention are applicable to video displays in general, including video monitors for use with computers. Thus, it is intended that references to "field" (as in field delay and field memory) in the context of television signal processing apply more generally to video scan sequences in non-interlaced video systems. Furthermore, although various embodiments of the invention relate to line doublers, aspects of the invention apply more generally to video scan rate converters and are not limited to line doubling. The time scale modification provided by the invention may provide scan rates suitable for use by computer system monitors. Moreover, with respect to line doubling, although ones of the preferred embodiments refer to 2-1 line doubling (which is suitable for line doubling in progressive scan reproducers), aspects of the invention are applicable to scan rate converters employing time scale modification or time compressors operating at ratios approximating 2-to-1 but slightly more or less than 2-to-1 (2.001-to-1, for example)(which is suitable for line doubling in interlaced scan reproducers).

FIG. 1 is an overall block diagram of a modular, field memory expansible scan line doubler 10 including a main path spatial domain line doubler including a chroma section 12 and a luminance section 14, and further including a temporal domain expansion circuit 16 and timing and sync processing circuitry 18. A removable connecting path or jumper 20 shown in dashed lines in FIG. 1 connects optional further path insertion points so as to enable the expansion circuit 16, and particularly the field delay memory elements 22 and 24 thereof, to be bypassed and eliminated without destroying the functionality of the section 14. Thus, by the expedient of removing the jumper 20 and installing the memories 22 and 24, the spatial domain line doubler 14 is expanded to become a three dimensional line doubler 10 in accordance with principles of the present invention. Depending on the implementation of the practical circuits, a physical jumper may not be required so long as the circuit provides functions substantially equivalent to those described herein. Alternatively, as described in connection with FIGS. 12 and 13, the further path insertion points may be in another location.

The chroma section 12 of the spatial line doubler includes a red minus luminance (R-Y) input 32 leading through an analog to digital converter 34. The converter 34 converts the R-Y component into eight bit digital quantization values at a sampling rate of four times the color subcarrier frequency (4 Fsc) in accordance with a 4 Fsc clock signal supplied over a line 36 from the timing and sync circuitry 18. The quantized R-Y signal is then supplied as one input of a two-input multiplexer 38. A blue minus luminance (B-Y) input 40 passes through an analog to digital converter 42, also quantizing at the 4 Fsc rate and into the multiplexer 38. Given the color coding convention, the R-Y and B-Y values alternate at a rate twice the frequency of the color subcarrier (2 Fsc). The 2 Fsc signal is generated by the timing and sync circuit 18 and supplied to the multiplexer 38 over a line 44.

The multiplexed R-Y, B-Y chroma bytes output from the multiplexer 38 are fed to line interpolation means 46 which interpolates pixels in original scan lines of the received video signal and puts out interpolated scan lines comprised of interpolated pixels. For example, in one embodiment means 46 operates to derive (A+B)/2 average pixels from the incoming scan lines. In a preferred embodiment, described below, the means 46 derives the averaged pixels from one-field delayed scan lines. Pixel interpolation other than averaging may be employed. The original and the interpolation scan lines are then sent to time scale modification means 48 which receives scan lines at the original, first scan line rate and puts them out at a second scan rate. For example, in a preferred embodiment the time scale modification means operates as a two-to-one line compression circuit 48, receiving scan lines at the original scan line rate and putting their out at two times the original scan line rate. As mentioned above, the time scale modification need not be an exact doubling but may be slightly different than doubling (such as 2.001) or may be some compression factor other than doubling. The scan line doubled lines are then passed through a demultiplexer 50 which demultiplexes the R-Y and B-Y color components. The R-Y component is then converted to analog in a digital to analog converter 52, and the B-Y component is then converted to analog in a digital to analog converter 54. These two components are then fed into a conventional color decoding matrix 56 which converts them, along with the luminance signal from the section 14, into red (R), green (G) and blue (B) color driving signals for application to a display operating at two times the original incoming line scan rate. A red amplifier 58 leads from the matrix to a red output 60; a blue amplifier 62 leads from the matrix 56 to a blue output 64; and a green amplifier 66 leads from the matrix 56 to a green output 68.

The luminance section 14 is substantially identical to the chroma section 12, except that the single luminance signal component is not multiplexed. Thus, a luminance input 70 leads into an analog to digital converter 72 which quantizes the analog luminance into eight bit bytes at a 4 Fsc quantization or sampling rate. The digitized luminance then passes to a luminance line interpolation means 74. Means 74 provides the same sort of interpolation as means 46. Thus, in one embodiment, means 74 generates (A+B)/2 interpolation pixels and in a preferred embodiment, described below, the interpolation pixels are derived from one-field delayed scan lines. When the jumper 20 is in place, the scan line domain (horizontal and vertical spatial domain) pixels pass directly to a luminance time scale modification means 76. Means 76 provides that same sort of time scale modification as means 48. Thus, in a preferred embodiment, means 76 operates as a two-to-one scan line compressor, taking in the pixel bytes at the original scan line rate and putting them out at twice the original rate. A digital to analog converter 78 then converts the line doubled luminance pixels into an analog data stream which flows into the color decoding matrix 56. As so far explained, the sections 12 and 14 are conventional and may be included within a single or a very few large scale integrated circuits at very low prime cost, such as $30.00 (U.S.) or less. The resultant spatial domain line doubler will work satisfactorily, particularly with small area displays. However, stationary vertical and diagonal transitions in the resultant picture display will be blurred, and flicker will be visible at large amplitude vertical and diagonal transitions.

The optional further path 16 includes three connections 80, 82 and 84 from the luminance section 14. The connection 80 is a bridging connection, and the connections 82 and 84 provide a series connection which is bypassed when the jumper 20 is in place. Alternatively, connections 80 and 82 may be viewed as inputs to the further path and connection 84 may be viewed as its output which is coupled to the main path. The connections 80, 82 and 84 are shown with plugs and jacks to denote that the entire circuit 16 may be optionally installed as a module. Alternatively, and most preferably, all of the circuitry of the sections 12, 14 and 16, except for the field memory units 22 and 24, is contained in a single VLSI circuit chip. Thus, in practice, the spatial domain (two dimension) line doubler comprising the sections 12 and 14 may be expanded to a spatial/temporal domain (three dimension) line doubler 10 merely by adding the field memory modules 22 and 24, and removing the jumper 20. While a jumper is depicted in FIG. 1, since the lines 82 and 84 are eight bits wide, eight bit digital path switches or multiplexers are a preferred implementation of the jumper. The multiplexers may be controlled by a single bit jumper.

Alternatively, as described in connection with FIG. 12, connections 82 and 84 may be located between the two-to-one line compressor 76 and the digital-to-analog converter 78.

A present field F0 signal on the bus 80 enters the first field delay 22 and also enters a motion detector, low pass filter and rectifier 110. A one field (262 line) delayed signal F1 extends from the first field delay 22 to the second field (263 line) delay 24 over a bus 86. The bus 86 also leads into a detail subtractor circuit 88.

The detail subtractor circuit 88 includes a magnitude comparator circuit 90 which compares the magnitudes of a byte on the bus 82 with a byte on the bus 86 and generates and puts out an add/subtract bit over a line 96. The logic signal on the line 96 controls operation of an arithmetic logic unit (ALU) 92 within the detail subtractor circuit 88, and the add/subtract logic signal on the line 96 also controls operation of another ALU 108 providing a detail correction adder/subtractor circuit. In practice, the ALU 92 subtracts the smaller input byte from the larger input byte, based upon the logical value put out by the magnitude comparator 90, and provides as its output the absolute value of the difference of the applied bytes. That absolute value represents vertical-temporal detail. Before reaching the circuit 108, the vertical-temporal detail pixels from the ALU 92 go to a motion subtractor circuit 98 via a bus 94.

The four most significant bit positions of the bus 94 enter a second magnitude comparator 100 which is located within the motion subtractor circuit 98. The second magnitude comparator circuit 100 compares the four most significant bits of the signal on the bus 94 with four bits on a motion control bus 116 coming from motion signal circuits 110, 112 and 114. Basically, the motion signal circuits 110, 112 and 114 compare the F0 and F2 (one frame delayed) pixels to determine whether the pixels are in motion or are stationary within the picture signal. The output on motion control bus 116 is a signal M responsive to the picture motion speed and amplitude of object in motion relative to background. M increases in amplitude with increasing motion speed and/or motion amplitude of object in motion relative to background. M changes slowly and stays reasonably constant within a few pixels' area. The result of the comparison by circuit 100 is a one bit control signal on a line 101 which controls operation of an ALU 102 within the motion subtractor circuit 98. If the detail four most significant bits are greater than the four bits on the motion control bus 116, the ALU 102 puts out the vertical-temporal detail bits minus the motion bits M. If the detail four most significant bits are less than the four bits on the motion control bus 116, the ALU puts out a null value (zero). The subtraction of the motion control bits M from the vertical-temporal detail bits functions as a variable threshold. As the amplitude of M increases less and less of the vertical-temporal detail remains.

The detail correction adder/subtractor ALU 108 is controlled by the same magnitude comparator 90 as controls the vertical detail subtractor ALU 92. The signal on the control line 96 causes the unsigned thresholded vertical detail to be added or subtracted to the line interpolated pixels on line 82 from the main path. In effect, the sign control bit reestablishes the polarity of the vertical-temporal detail signal as it was prior to the absolute value action in block 88.

Figure 2A:
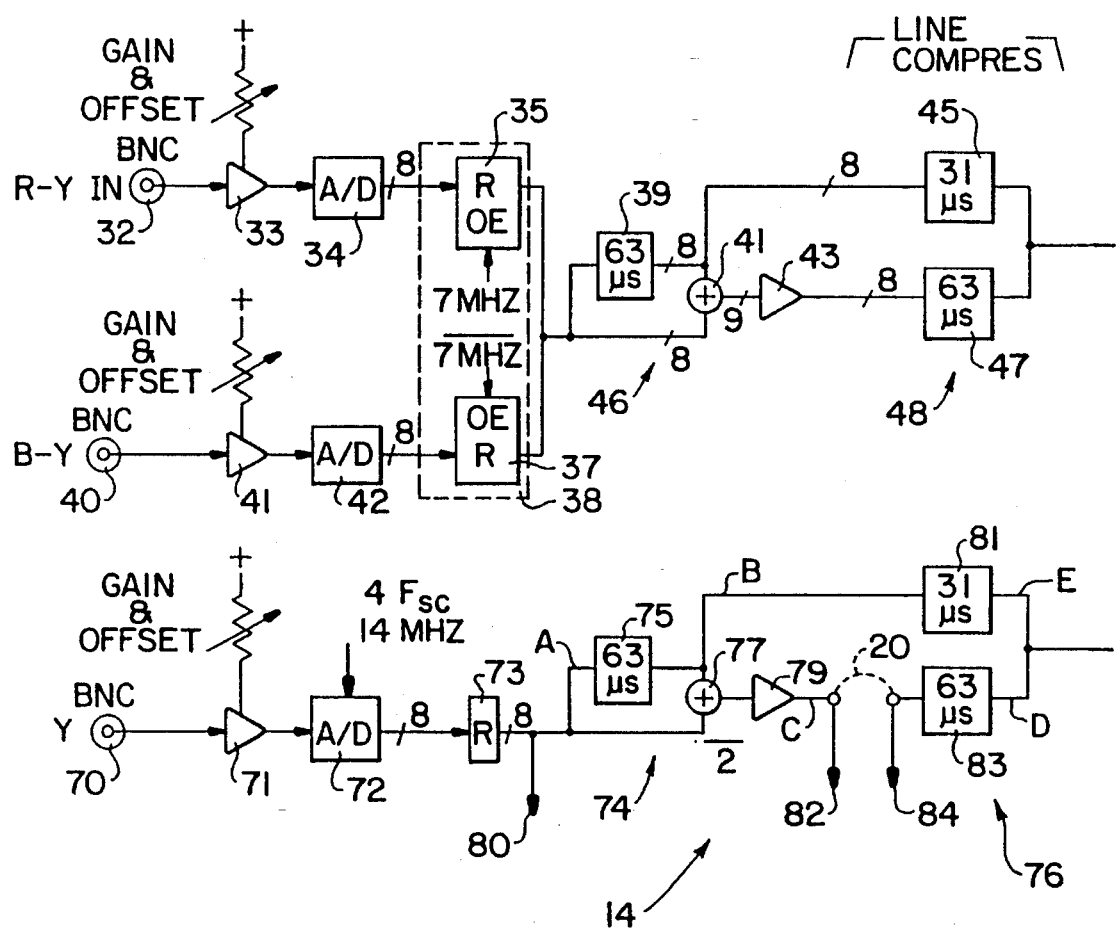
FIG. 2 is a more detailed block diagram of a main-path intra-field line doubler portion of the FIG. 1 circuit for both chroma and luminance.
Figures 2, 2B:
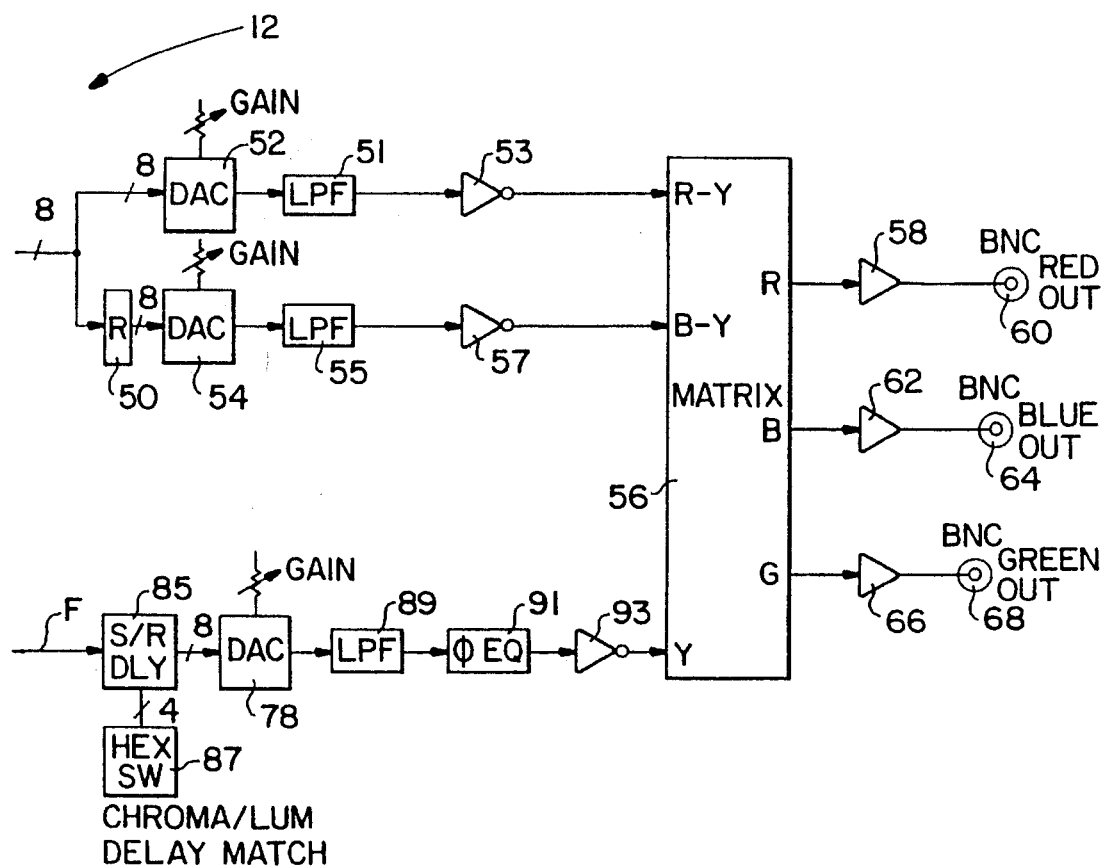

The circuitry of the spatial domain chroma/luminance line doubler comprising sections 12 and 14 is shown in greater detail in FIG. 2. Therein, gain and offset amplifiers 33, 41 and 71 are respectively in series between input 32 and A/D 34; input 40 and A/D 42; and, input 70 and A/D 72. The multiplexer 38 is comprised of two registers 35 and 37 clocked at the 2 Fsc rate. The register 35 is clocked at 2 Fsc true, while the register 37 is clocked by a logical complement of 2 Fsc. The chroma line interpolator 46 includes a one line (63 microsecond in NTSC) delay 39 and a summing junction 41 which adds pixel bytes from two adjacent scan lines together (A+B). A one-half gain amplifier 43 from the output of the summer 41 provides the (A+B)/2 average output. The original pixel bytes are clocked into a delay 45 having a delay equal to one half of the original scan line period (e.g. 31 microseconds in the NTSC signal format) at the original byte clocking rate 4 Fsc on the line 36, and are clocked out at the line doubled clocking rate 8 Fsc on the line 31. The interpolated pixels are clocked into a delay 47 having a delay equal to the original scan line period (e.g. 63 microseconds in the NTSC signal format) at the original clock rate 4 Fsc, and they are clocked out of the delay 47 at the line doubled scan rate 8 Fsc. The color pixels are demultiplexed by a register 50 which operates at the 2 Fsc rate. Low pass filters 51 and 55 remove any aliasing and quantization errors or residues following the DACs 52 and 55, and inverting amplifiers 53 and 57 provide gain control and impedance matching for the matrix 56.

Similarly, the luminance path includes a gain and offset amplifier 71 between the input 70 and A/D 72. A register 73 provides delay matching to match chroma path delays. The line interpolator includes a delay 75 having a delay equal to an original scan line period (e.g. 63 microseconds for NTSC) and a summer 77. Original pixels are clocked into a delay 81 at the original clock rate 4Fsc and are clocked out at the line doubled rate 8Fsc. The delay 81 has a delay equal to one half the original scan line delay. The interpolation pixels from the adder 77 (A+B) are halved in amplitude by a half gain adder 79 to provide the desired average (A+B)/2. The output bus from the half gain adder 79 leads to the bus 82 and jumper 20. The bus 84 (and jumper 20) lead into a delay 83 which takes pixel bytes in at the original clocking rate 4 Fsc and clocks them out at the line doubled rate 8 Fsc. A luminance/chroma delay match circuit includes a shift register 85 and a hex switch 87 which enables a selectable number of clock delays to be inserted in the luminance path appropriate to match delays occurring in the chroma path incident to multiplexing, etc. The respective gains of the DACs 52, 54 and 78 are adjustable. A low pass filter 89, phase equalizer 91 and inverting amplifier 93 are located between the DAC 78 and the color matrix 56.

Figure 3B:
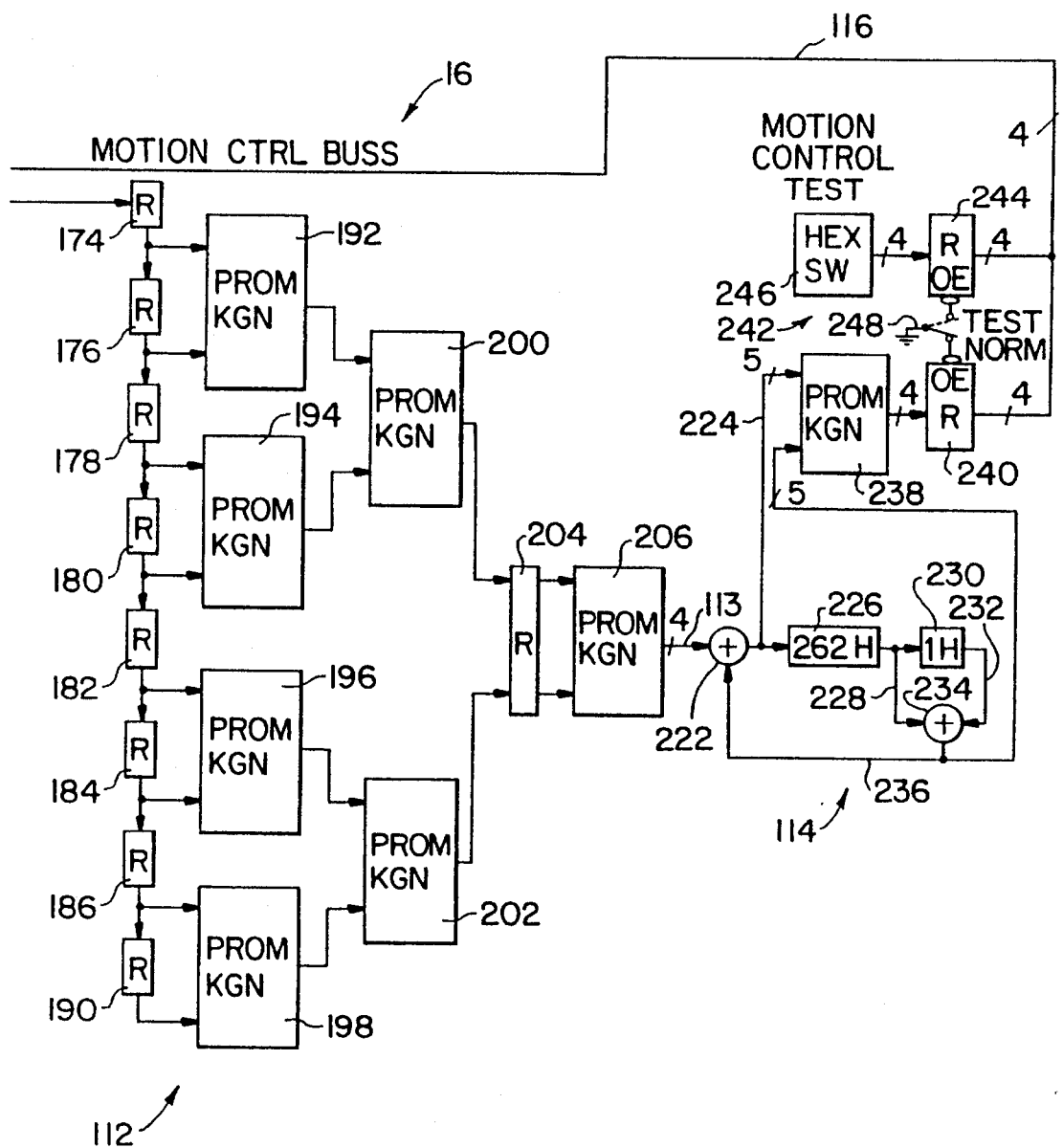
FIG. 3 is a more detailed block diagram of a modular, expansible further path which, when added to the FIG. 2 main path circuit, extends the FIG. 2 circuit to full capability as a three dimensional scan line doubler.

Turning now to FIG. 3, further details of the additive circuit section 16 are shown. The motion detection circuit 110 includes two registers: a register 122 connected to the bus 80, and a register 124 connected to the output of the second field delay circuit 24. These registers feed a summing circuit 126 which takes the difference and puts out an eight bit value and a sign bit to a latch 128. A PROM 130 functioning as a dynamic range or gain expansion circuit expands the gain of the incoming difference signal tip to certain saturation values after which gain remains constant and puts out a gain expanded motion signal to a latch 132. For example, if a zero motion value equates to digital 128, then plus or minus digital 31 motion values are expanded to plus or minus 128 values, the full dynamic range of the 8 bit video quantization. An output from the motion detector portion of the circuit 110 is provided on a bus 134.

The bus 134 leads to a digital low pass filter 135 following a finite impulse response architecture which spreads out a pulse over time. This process reduces the level of the pulse, and therefore the gain expander PROM 130 preemphasizes the motion control values in order to make up for the losses occurring in the low pass filter. The digital low pass filter 135 includes a series of registers 136, 138, 142, 144, 152, 156 and 160, and summing circuits 146, 150, 162 and 166, configured as shown in FIG. 3. The operation of these circuit elements establishes a series of zeros located at and above the color subcarrier frequency Fsc, thereby eliminating any high frequency elements (including noise) from the motion control.

The low pass filtered motion control signal is then latched in a latch 168 and applied to a PROM 170 configured to perform a full wave rectification function upon the motion control signal. This "rectification" removes the sign of the motion control signal irrespective of direction of movement of the pixels within the picture image signal. A register 172 latches the output of the rectifier PROM 170 and puts out the low pass filtered, full wave rectified motion control signal on a bus 111 leading to the horizontal expansion circuit 112.

The horizontal expansion circuit 112 includes a chain of registers 174, 176, 178, 180, 182, 184, 186 and 190 as shown in FIG. 3. Bus taps from the registers lead into "keep greater number" (KGN)PROMs 192, 194, 196 and 198. Outputs from PROMs 192 and 194 feed into a KGN PROM 200, and outputs from PROMs 196 and 198 feed into a KGN PROM 202. Outputs from the KGN PROMs 200 and 202 are concentrated in a register 204 and applied to a final KGN PROM 206 which provides an output over a bus 113.

The function of the horizontal expansion circuit 112 is to generate a motion control signal which expands in time in the horizontal domain to embrace the motion transition and an area along the line scan structure embracing the motion transition as detected from frame to frame. This function is further explained in conjunction with FIG. 9 hereinafter.

The vertical/temporal expansion circuit 114 includes a field domain summing junction 222 having an output bus 224 leading into a 262 line (one field) delay 226. The field delay 226 has an output bus 228 leading to a one line delay 230. The one line delay 230 has an output bus 232 leading to a line domain summing circuit 234 which takes a difference between the motion control pixel bytes on successive scan lines and provides an output on a bus 236. The bus 236 feeds back into the field domain summing junction 222 which thereby takes a field difference between the incoming motion control pixel bytes and field plus (A+B)/2 delayed pixel bytes. This arrangement establishes a field recirculation circuit for expanding the motion control in the vertical and temporal domains, as discussed hereinafter in connection with FIG. 10. The values on the buses 224 and 236 are applied to address a KGN PROM 238 which results in vertical/temporal domain expansion of the motion control signal. An output from the PROM 238 is held in a register 240 and then put out as a four bit (16 level) control signal on the bus 116. A test circuit 242 including a register 244, motion control setup switch 246 and test/operate switch 248 are provided to test operation of the motion control additive circuitry 16.

Figure 4:
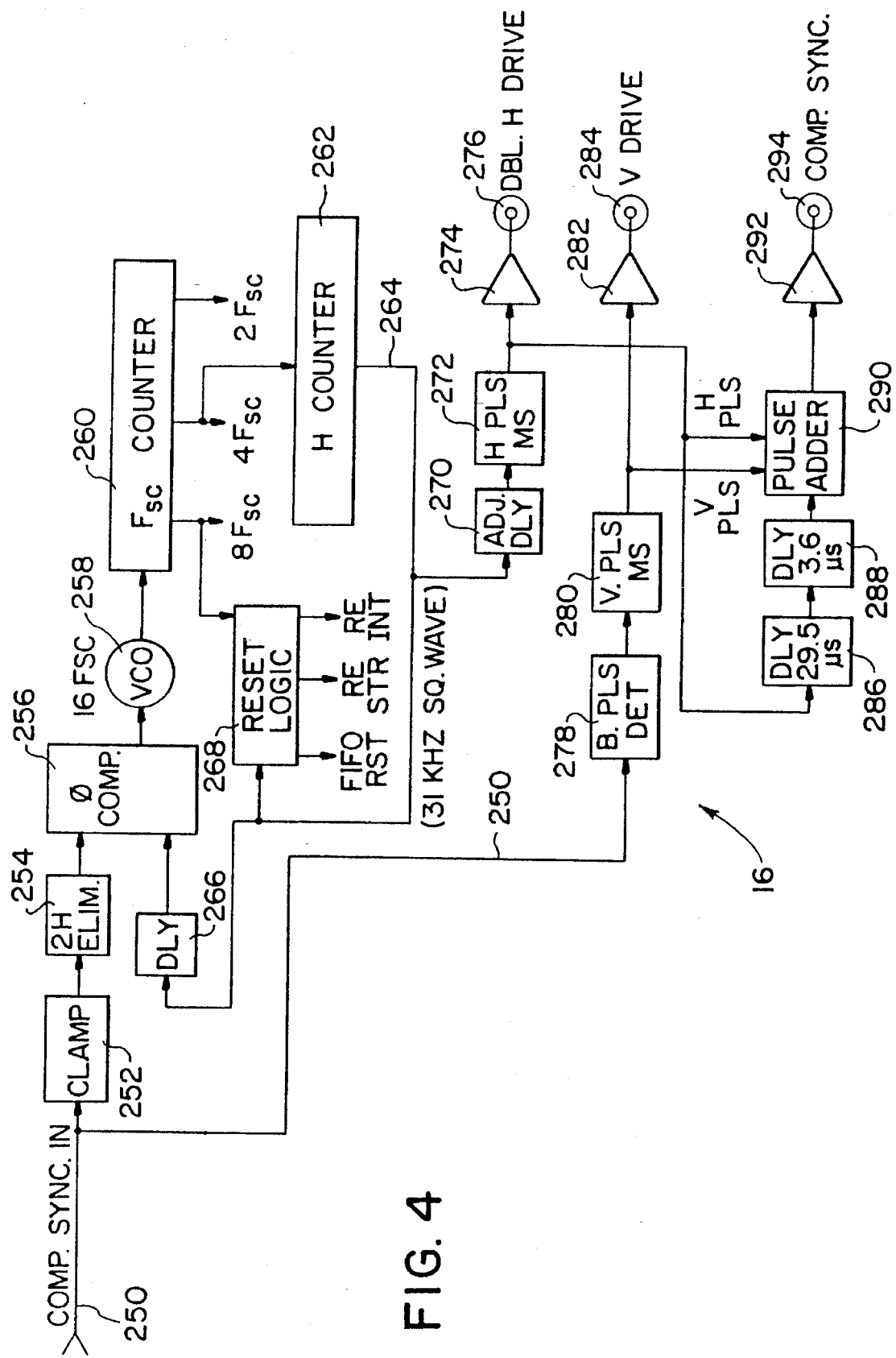
FIG. 4 is a more detailed block diagram of a timing module of the FIG. 1 circuit.

The timing circuitry 18 is shown in greater detail in FIG. 4. A composite sync input line 250 receives composite sync in analog form from detector/sync separator elements of the television receiver. The sync signal is passed through a clamp circuit 252 and a notch filter 254 to eliminate the second harmonic of the horizontal line scan component. The filtered sync then is applied as one input to a phase comparator 256 of a phase locked loop which further includes a voltage controlled oscillator operating e.g. at 16 Fsc, a Fsc counter 260 which generates the 2 Fsc, 4 Fsc and 8 Fsc clocking signals, and a horizontal counter 262 which generates a horizontal clocking signal at the scan line doubled rate (31 kHz in NTSC) and puts this signal out over a line 264. The signal on the line 264 passes through a delay match 266 and is applied as a second input to the phase comparator 256 to complete the phase locked loop. The phase comparator 256 locks the loop to the phase and frequency of the incoming composite sync in conventional fashion. The double H clocking pulses on the line 264 are also applied to a reset logic circuit 268 which generates reset signals for the FIFO registers 45, 47, 81 and 83, and strobe and interrupt signals for the registers.

The double H clocking signal on the line 264 is also applied through a delay adjust circuit 270 to a horizontal pulse generator 272 which generates horizontal sync pulses at the scan line doubled rate. These double H sync pulses are amplified in a driver 274 and put out at a port 276.

The composite sync on the line 250 is also passed through a blanking pulse detector 278 and a vertical interval pulse generator 280 which generates and puts out vertical sync, including the blanking pulses, through a driver 282 to a vertical drive port 284.

Outputs from the horizontal pulse generator 272 and the vertical pulse generator 280 are applied through delay circuits 286 and 288 for delaying the signals by one half of the original scan line period and also directly to a pulse adder circuit 290. The one half H delayed horizontal pulses and the undelayed horizontal pulses and vertical interval pulses are combined in the adder circuit 290 and put out via a driver 292 to a composite output port 294.

Figure 5A:
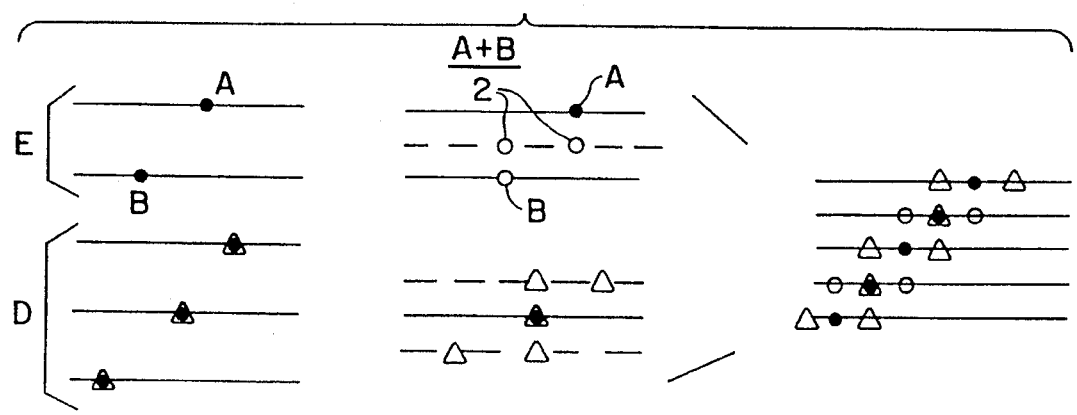
FIG. 5A is a series of graphs illustrating operation of the FIG. 2 circuit.

FIG. 5A illustrates operation of the two dimensional (spatial domain) line doubler (either the chroma doubler 12 or the luminance doubler 14 with the jumper 20 in place). At the left of FIG. 5A there are Five segments of adjacent scanning lines, two belonging to an even field (E), and three belonging to an adjacent odd field (0). A diagonal transition, denoted by solid black dots in the even field, and by solid black triangles in the odd field, is depicted. The middle portion of FIG. 5A illustrates the line averaging process as yielding interpolation samples which are open circles in the even field and open triangles in the odd field. The right of FIG. 5A illustrates the resultant picture display in which the even and odd fields are overlaid, as occurs with the eye-brain perception/integration process of the viewer. The transition is not only widened from one pixel to three pixels, but a zig-zag flicker occurs which is perceptible at the frame rate (30 Hz). This flicker occurs because the open body interpolation pixels have only one half of the amplitude of the solid body pixels creating a contrast band along the transition.

Figure 5B:
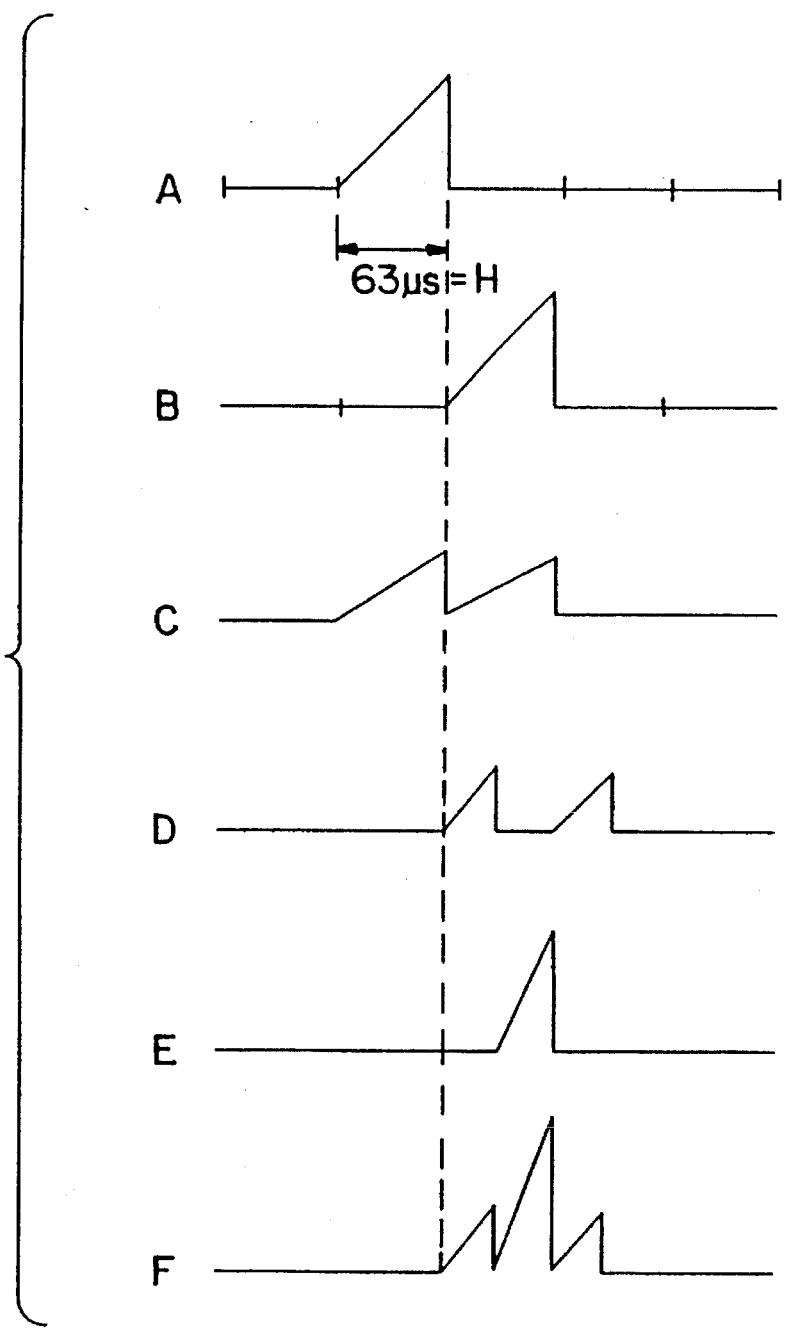
FIG. 5B is a series of waveform graphs taken at noted locations within the FIG. 2 circuit.

FIG. 5B illustrates action of the line interpolator 74 and 2:1 compression circuit 76 when a black to white ramp signal is applied to one scan line at the luminance input 70. The various signals graphed in FIG. 5B are lettered with letters marking circuit locations within FIG. 2.

Figure 6:
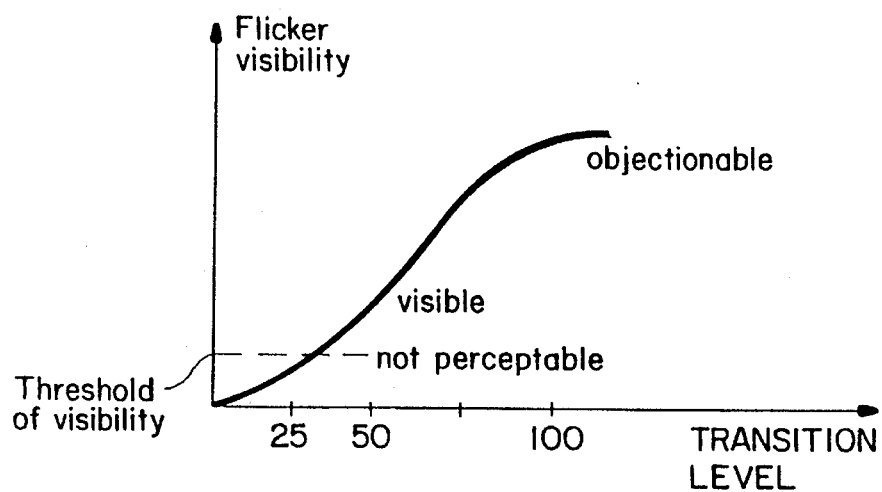
FIG. 6 is a graph of flicker visibility as a function of transition level for the FIG. 2 circuit.

FIG. 6 illustrates flicker visibility as a function of vertical or diagonal transition level. FIG. 6 should be understood as a conceptual representation of a very nonlinear relationship between IRE level of the transition, and the perception of flicker. What appears to be true from observation is that up to about 25 IRE units of transition amplitude, flicker is not usually perceptible at all. From 25 to 50 IRE units, the threshold of perception is usually reached, and from 50 to 100 IRE units of transition amplitude, the flicker progresses from visible to very objectionable. Of course, actual data will depend upon the contrast capability and persistence of the particular display device, and the viewer's subjective sensitivity to flicker. Suffice it to say, with high contrast, short persistence, large area displays, flicker becomes an objectionable annoyance with the two dimensional line doubler structure 14.

The FIG. 7 block diagram vastly simplifies the FIG. 1 structure 10 in order to illustrate even more clearly principles and advantages of the present invention. It is to be seen in FIG. 7 that the system 10 includes a luminance main path 14 comprising the elements 72, 74 and 76, and the buses 80, 82 and 84. Without more, the resultant very low cost line doubler provides interpolation pixels from the line interpolator in accordance with (A+B)/2 as illustrated in FIG. 5, with the attendant drawbacks already noted.

A second and additive path 16 connects to the main path and essentially includes the field memory units 22 and 24, a subtractor 88, a control 98 and a summing junction 108 operating under the control of the motion detection and control generation circuits 110, 112, 114.

The field memory unit 22 is set to provide a delay of 263 lines, which is convenient in the sense that it is an integral number of scan lines at the original scan rate. This delay represents one field plus one half scan line (a field being 262.5 scan lines). The delay of the field memory unit 22 is set to be exactly in accord with the delay of the line interpolation circuit 74, so that the output of the memory unit 22 represents truly the one field delayed pixel (F1 pixel) at the same spatial location of the pixel average (A+B)/2 being generated by the line interpolator 74.

The subtractor 88 generates and puts out the function

|F1−F0[(A+B)/2]| to the control circuit 98. When |F1−F0[(A+B)/2]| is less than the motion control signal M, the output of 98 is zero. When |F1−F0[(A+B)/2]| is greater than the motion control signal M, the output of 98 is

{|F1−F0[(A+B)/2]|−M}.

ALU 108 combines the output of circuit 98 with the line interpolator output on line 82 to generate a signal which may be expressed as

F0[(A+B)/2]±{|F1−F0[(A+B)/2]|−M}.

Whether the sign of the second term of the above expression is plus or minus at any given time is determined by the sign bit on line 96.

No motion and full motion are the two extreme operating conditions. When there is no motion, the motion control signal M is zero. The sign bit restores the original polarity such that the expression becomes

F0[(A+B)/2]+F1−F0[(A+B)/2]=F1.

The correction signal thus cancels the line interpolation pixels from the main path on line 82, leaving only the prior field pixels F1. In the case of a stationary diagonal transition, this operation results in a transition display which is very smooth and sharp, as shown in the line doubled display graphed in FIG. 8A and which is undistorted by any interpolation artifacts.

When there is motion, the output from the control 98 is essentially zero, and there is nothing additively to cancel from the main path. The result is the main path output [(A+B)/2]F0, having for a diagonal transition an appearance graphed in the line doubled display graph of FIG. 8B.

For conditions between the no motion and full motion extremes, the result of combining the correction signal with the main path line interpolation pixels is the addition or subtraction of a correction signal (|F1−F0[(A+B)/2]|) from which the motion control signal M is subtracted. M thus functions as a variable threshold by progressively reducing the correction signal as motion speed and/or amplitude of object in motion relative to background increases.

The motion control circuitry depicted in FIGS. 1 and 3 and described in conjunction therewith preferably implements and applies a variable threshold in series with the subtractor circuit 88, the threshold level being controlled by the magnitude of the motion control signal put out by the motion control circuits 110, 112 and 114, such that the threshold is set at a high level when the motion control signal has a high value, and the threshold is set at a low level when the motion control signal has a low value.

In practice this arrangement is most desirable and results in a smoothing appearance, preventing an overall picture image from instantly becoming fuzzy or blurry when a slow or small area motion is detected. If very fine picture details are present, and if the motion is very slow or limited in area, the fine picture details (one field delayed pixels) will be selected in lieu of average pixels, as the motion control threshold will be low. As motion increases in speed or amplitude of object in motion relative to background, or both, the switchover threshold increases such that some fine picture details will now not be available for interpolation. Eventually, with a high motion level the switchover is complete, and only averaged pixels will be put out as interpolation pixels. This approach of varying the switchover level as a function of motion results in a smoothed, gradual, non-abrupt switchover from field-delayed spatially aligned pixels (fine picture detail) to the average pixels while minimizing onset of perceptible flicker.

When the circuit 16 is not in place, the reduced but very useful functionality of the very low cost main path 14 remains unaffected. When the additive modular circuit 16 is in place, a significantly improved line doubler 10 results.

While the line doubling algorithms implemented by the improved line doubler 10 are known in the prior art, a significant contribution of the present invention is the appreciation that the circuit 16 only manipulates the difference, i.e. the flicker component, present in the main path. The main path is essentially passive, meaning that it operates the same way whether there is motion or no motion. The additive path removes the line interpolator artifacts where the picture image is stationary and does not remove the line interpolator artifacts where there is motion in the picture image.

One clear advantage of manipulating only the interpolation difference signal by the additive circuit 16 is that the difference signal is very low level. Since it is a low level signal that is being manipulated, the circuit 16 may make interpolation errors or mistakes without generating unacceptable artifacts in the resultant display. Also, the detection of motion in every instance is not essential to satisfactory performance. Accordingly, the additive circuit 16 is set to err on the side of the presence of motion, whether or not the particular picture activity is actually in motion. The only down side to this approach is the occasional and slight flicker or softness of vertical or diagonal transition edges.

The control 98 can be set to impose a threshold, so that e.g. there is no switch to the field delayed pixel until the flicker level (FIG. 6) reaches the threshold of perception, i.e. about 25 IRE units.

The motion detection circuit 110 starts at the onset of motion, but it stops one field later than the last motion condition is present. A full frame is needed for motion detection, rather than a single field. Otherwise, vertical transitions from field to field may be confused for motion in the picture image. Ideally, the motion control should start before the onset of motion, and should stop after the motion condition has passed, thereby centering the motion condition within the motion control window. However, we have discovered that so long as the motion control is not started after the onset of motion, there is very little noticeable drawback.

The motion detection circuit 110 also includes a digital low pass filter which is designed to have a zero at the color subcarrier frequency Fsc and other zeros above that frequency, to eliminate noise and high frequency picture elements, adding to the robustness of the motion control signal. The full wave rectifier function removes the sign of the motion from frame to frame, so that the motion control signal operates as an absolute value.

As diagrammed in FIG. 9, the horizontal expansion circuit 112 delays the motion control signal by a plurality of Fsc clock intervals, such as 1 Fsc, 2 Fsc, 3 Fsc and 4 Fsc. The variously delayed motion control signals are then fed into the "keep greatest number" arrays, which results in a horizontal domain expanded motion control signal shown as "motion out" in FIG. 9. By providing controlled register delays in the main path 14 (and delay matches in the additive path 16) it is practical to bracket detected motion conditions by the horizontally expanded "motion out" control signal put out by the circuit 112.

Figure 10A:
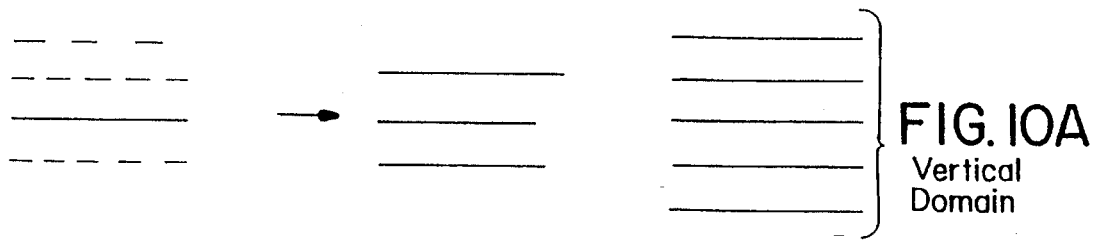
FIG. 10 is a series of graphs illustrating operation of a vertical and temporal domain expansion circuit of the FIGS. 1 and 3 circuits with FIG. 10A showing vertical expansion of the motion control signal, FIG. 10B showing a three dimensional vector plot of the motion control signal lying in a vertical/temporal plane, FIG. 10C showing an incoming motion control signal in the vertical/temporal domain, and FIG. 10D showing the effect of temporal recirculation in order to expand the motion control in the vertical/temporal domain.
Figure 10B:
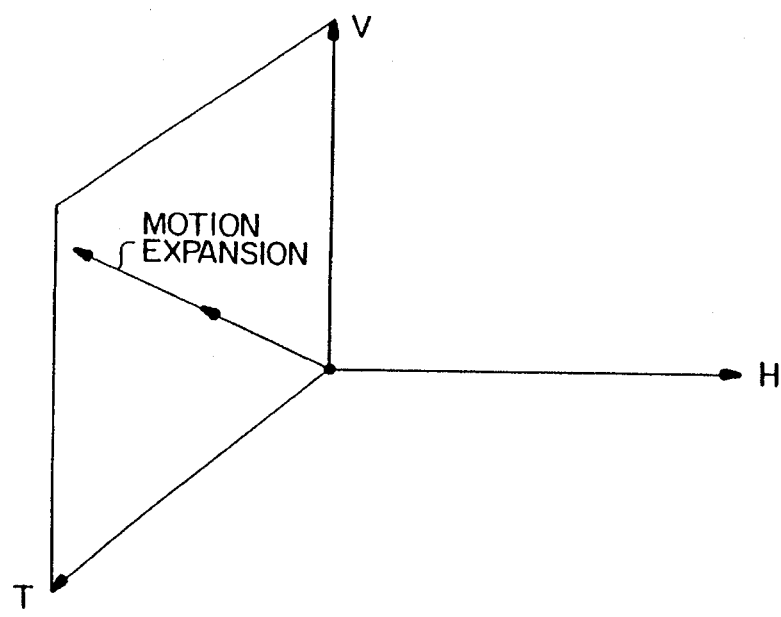
Figure 10C:
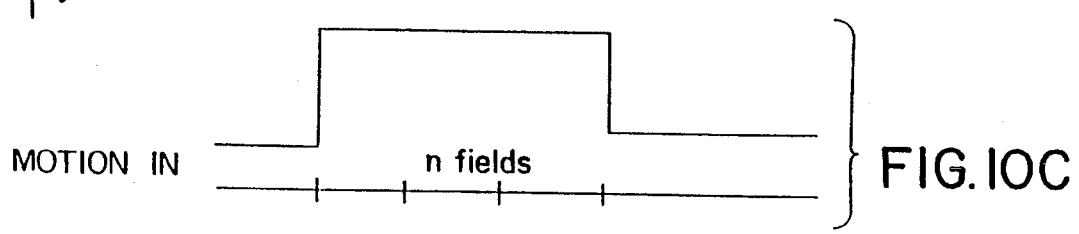
Figure 10D:
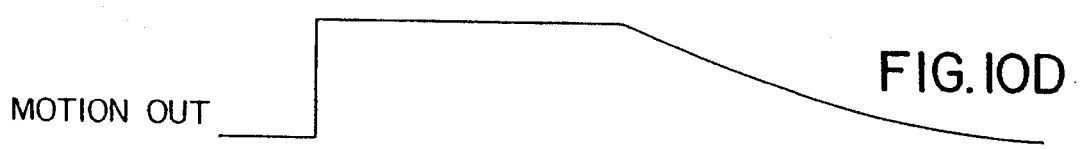

The vertical/temporal expansion circuit 114 carries out vertical, temporal domain expansion of the motion control signal by implementing a 262.5 line recirculation loop with the elements 222, 226, and 234. This approach has been described within a noise reduction system in co-inventor Faroudja's prior, commonly assigned U.S. Pat. No. 4,670, 775, the disclosure of which is hereby incorporated by reference. As shown in FIG. 10A, field recirculation causes an expansion or averaging in scan lines as field intervals progress. A single line expands to three lines, which expands to five lines, etc. FIG. 10B shows that the motion expansion vector extends in a plane including the vertical and temporal (T) dimensions. FIG. 10C shows the motion control input to the circuit 114, and FIG. 10D shows the vertical/temporal expansion at the end of the input motion interval as a decay rolling off over a plurality of fields. This approach, previously demonstrated to be efficacious for chroma noise reduction, works very well for developing a motion control signal having a robustness and high signal to noise ratio, and it also desirably results in a control which errs in favor of motion, rather than non-motion. Thus, the F1 pixel is substituted for the line interpolation average, only when motion clearly is not present in the picture image.

Figure 11:
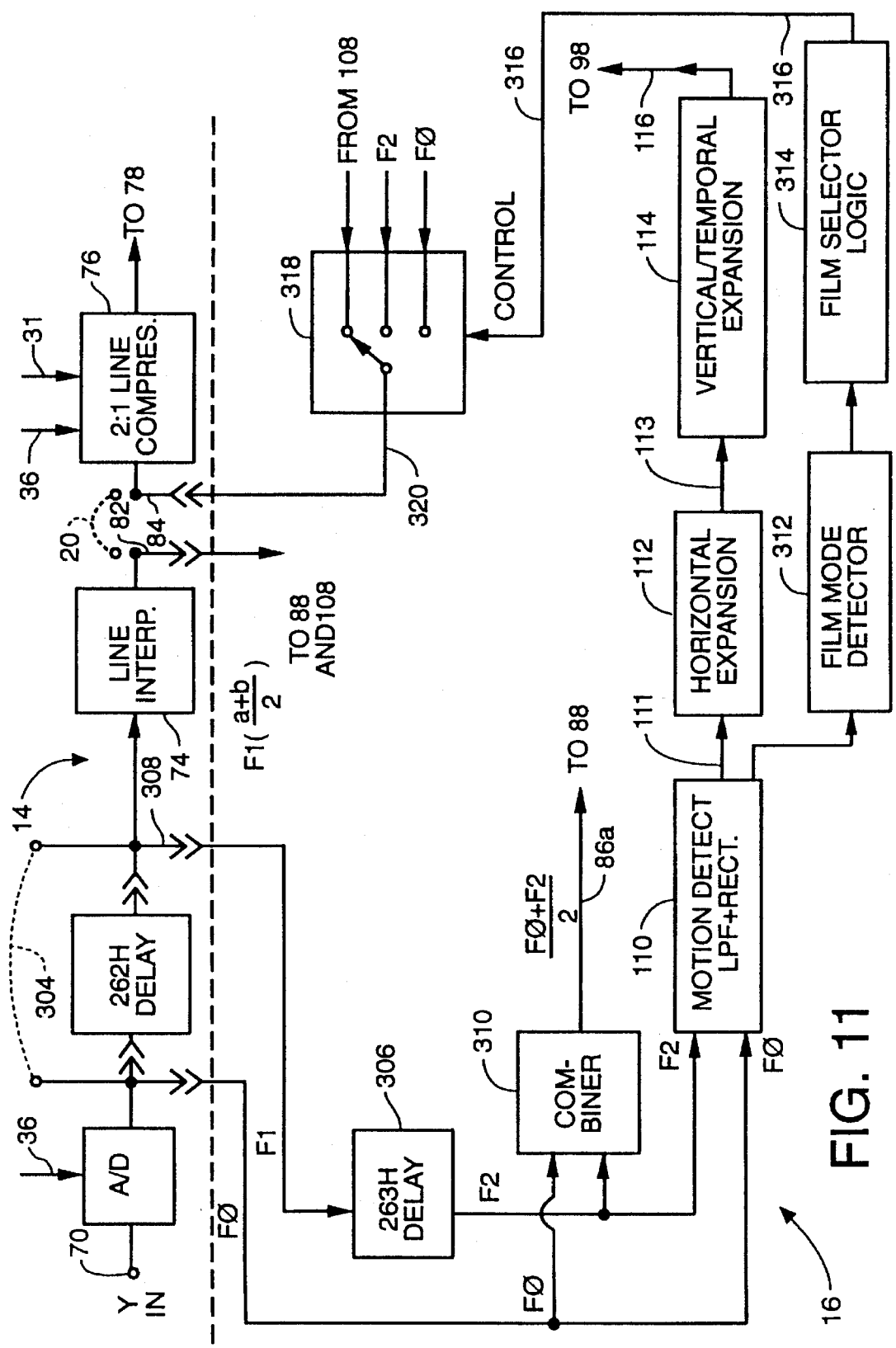
FIG. 11 is a block diagram showing a modification of the arrangement of FIG. 1.

A modification of the arrangement of FIG. 1 is shown in the block diagram of FIG. 11. The arrangement as modified in accordance with FIG. 11 is the preferred embodiment of the present invention. For simplicity only the modifications to the luminance portion of the arrangement of FIG. 1 is shown in FIG. 11. The remaining portions of the embodiment represented by FIG. 1 remain essentially unchanged.

Referring to FIG. 11, the main luminance path is modified by the presence of a removable field delay memory (262 line) element 302. A jumper 304 shown in dashed lines enables the field delay memory elements, to be bypassed and eliminated without destroying the functionality of the section 14. The further path 16 includes a removable field delay memory (263 line) element 306. Thus, in a manner similar to the use of FIG. 1, by the expedient of removing the jumpers 304 and 20 and installing the memories 302 and 306, the spatial domain line doubler 14 is expanded to become a three dimensional line doubler in accordance with principles of the present invention. Depending on the implementation of the practical circuits, a physical jumper may not be required so long as the circuit provides functions substantially equivalent to those described herein.

The modified embodiment also includes a removable 262 line field memory element in the main path of the chroma portion of the circuitry between the multiplexer 38 and the line interpolator 46 (FIG. 1). For simplicity this element is not shown in FIG. 11.

The optional further path 16 of FIG. 11 includes three connections 80, 308, 82 and 84 from the luminance section 14. Connections 80, 308 and 82 provide inputs to the further path and connection 84 is the further path output which is coupled to the main path. The connections 80, 308, 82 and 84 are shown with plugs and jacks to denote that the entire circuit 16 may be optionally installed as a module. Alternatively, and most preferably, all of the circuitry of the sections 12 (not shown in FIG. 11 ), 14 and 16, except for the field memory units 302 and 306, is contained in a single VLSI circuit chip. Thus, in practice, the spatial domain (two dimension) line doubler comprising the sections 12 and 14 may be expanded to a spatial/temporal domain (three dimension) line doubler merely by adding the field memory modules 302 and 306, and removing the jumpers 304 and 20. While jumpers are depicted in FIG. 11, since the lines 82 and 84 are eight bits wide, eight bit digital path switches or multiplexers are a preferred implementation of the jumper. The multiplexers may be controlled by a single bit jumper.

Alternatively, as described in connection with FIG. 13, connections 82 and 84 may be located between the two-to-one line compressor 76 and the digital-to-analog converter 78.

A present field F0 signal on the bus 80 enters the motion detector, low pass filter and rectifier 110. A one field (262 line) delayed signal F1 from the first field delay 302 in the main path is applied via bus 306 to the second field (263 line) delay 306 is applied to block 110. Blocks 110, 112 and 114 operate in the same manner as in the embodiment of FIG. 1 and provide a signal on line 116 to block 98.

An element new to FIG. 11, combiner 310, receives the F0 and F2 signals from bus 80 and delay 306, respectively. Combiner 310 functions as a combiner and averager providing at its output (F0+F2)/2, an average of the additive combination of the present field and the present field delayed by one frame (two fields). The output of combiner 310 is applied via bus 86a to block 88. Thus block 88 receives (F0+F2)/2 rather than F1 as in the embodiment of FIG. 1.

The embodiment of FIG. 11 also differs from the embodiment of FIG. 1 by the addition of a film mode detector 312, a film selector logic circuit 314 and a three position switch 318 controlled by the output of logic circuit 314 via bus 316. In the switch position shown, the output of block 108 is applied to bus 84 as it is in the embodiment of FIG. 1. In the other two switch positions the F2 and F0 signals, respectively, are applied to bus 84 via bus 320. Details of the film mode detector 312 and film selector logic 314 and their operation are set forth in U.S. Pat. Nos. 4,876,596 and 4,989,090, assigned to the same assignee as the present application. Both the '596 and '090 patents are incorporated herein by reference.

In view of the changes in the embodiment of FIG. 11, the output of the line interpolator 74 is F1[(A+B)/2] rather than F0[(A+B)/2] and the subtractor 88 generates and puts out the function $$|(F0+F2)/2 - F1[(A+B)/2]|$$

to the control circuit 98 instead of $$|F1 - F0[(A+B)/2]|.$$

Thus, for the extreme case of no motion, the correction signal when applied to and combined with the main path results in the signal (F0+F2)/2 being applied to the line compressor 76, for the extreme case of full motion, the signal F1[(A+B)/2] is applied to line compressor 76, and for intermediate conditions between no motion and full motion, the correction signal added to or subtracted from the main path signal is derived from (F0+F2)/2 and F1[(A+B)/2] and, as in the embodiment of FIG. 1, is subject to a threshold derived from motion speed and/or amplitude of object in motion relative to background. Thus, the expression for the ALU 108 output is modified and may be expressed as $$F1[(A+B)/2] \pm \{|(F0+F2)/2 - F1[(A+B)/2]| - M\}$$

instead of $$F0[(A+B)/2] \pm \{|F1 - F0[(A+B)/2]| - M\}.$$

As is the case in the embodiment of FIG. 1, whether the sign of the second term of the above expression is plus or minus at any given time is determined by the sign bit on line 96.

Thus, in the modified embodiment of FIG. 11, the correction signal is derived from the video scan sequences prior to and subsequent to the video scan sequence received by the line interpolator 74 instead of being derived from the video scan sequence immediately prior to the video scan sequence received by the line interpolator 74. In both embodiments the correction signal is also derived from the line interpolated pixels generated by the line interpolator 74. The approach set forth in the embodiment of FIG. 11 is preferred and is believed to provide better results. Ill the embodiment of FIG. 1, a discrepancy of 1/60 second results between an object moving and not moving. By averaging the images just before and just after, the FIG. 11 embodiment provides temporal averaging which eliminates sudden temporal jumps. The correction signal derived in the embodiment of FIG. 11 is thus based on both temporal and spatial averaging, providing a correction which is more symmetrical and less likely to result in perceived artifacts in the reproduced picture.

In preferred structural form, all of the circuitry of the improved line doubler 10, except for the field memory units 22, 24, 226, 302 and 306 for example, is contained in a single very large scale integrated circuit chip. To upgrade the line doubler from the basic unit 14 to the enhanced unit 10, the field memories are plugged in, and the jumper 20 and/or 304 is (are) effectively disconnected. In practice, the presence of the field memory units is detected, and the "jumper" 20 and/or 304 is (are) automatically, electrically removed.

Figure 12:
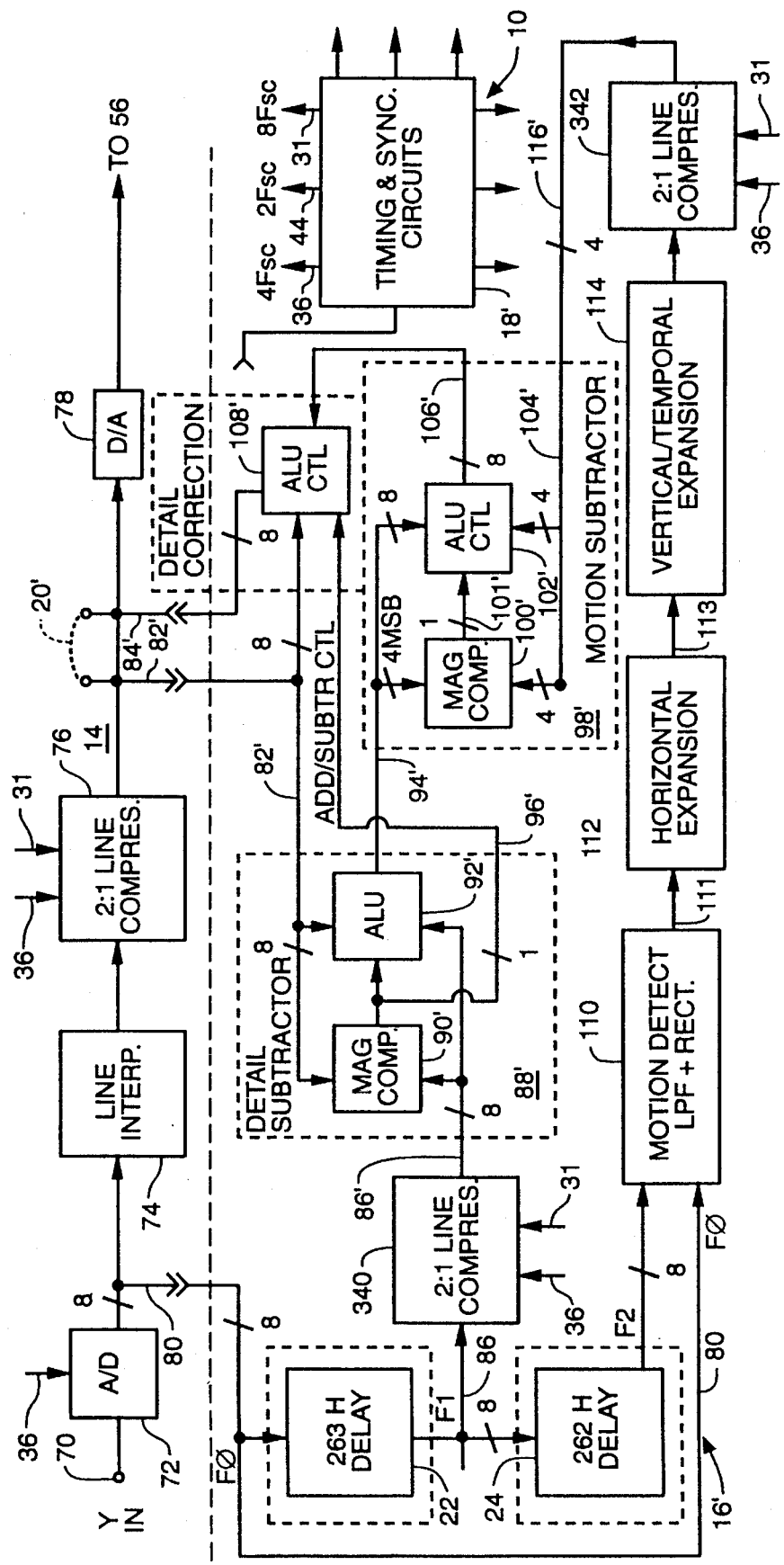
FIG. 12 is a block diagram showing a modification of the arrangement of FIG. 1 in which the optional further path insertion means is in an alternative location—between the time scale modification means and the output.

Referring now to FIG. 12, a modification of FIG. 1 is shown in which connections 82 and 84 are located between the two-to-one line compressor 76 and the digital-to-analog 78. The relocated connections are labeled as 82' and 84' and the jumper is labeled as 20'. In order to accommodate the relocated further path insertion point, a time scale modification means (labeled 2:1 line compressor) 340 is inserted in the 263H delayed $F_1$ signal line and a further time scale modification means (also labeled 2:1 line compressor) 342 is inserted in the motion control bus 116 output from block 114. The time scale modification means 340 and 342 operate in the same manner as does block 76 of FIG. 1. The time compressed output of block 340 on line 86' is applied to a modified detail subtractor 88'. The time compressed output of block 342 on line 116' is applied to a modified motion subtractor 98'. Blocks 88' and 98' are interconnected with a detail correction ALU 108' in the same manner as in FIG. 1. Blocks 88', 98' and 108' operate in the same manner as the corresponding blocks of FIG. 1 except that in the embodiment of FIG. 12 they operate at twice the clock frequency as a result of the time compressed inputs applied to them. Timing and sync. circuits 18' are modified to provide the higher clock rates required. Each of the modified elements in FIG. 12 corresponding to an element in FIG. 1 carries the same reference numeral but with a prime mark acided. Because of the requirement that blocks 88', 98' and 108' operate at a higher clock frequency, the arrangement of FIG. 1 is preferred over that of FIG. 12. However, as noted above, the modified arrangement of FIG. 11 is the preferred embodiment.

Figure 13:
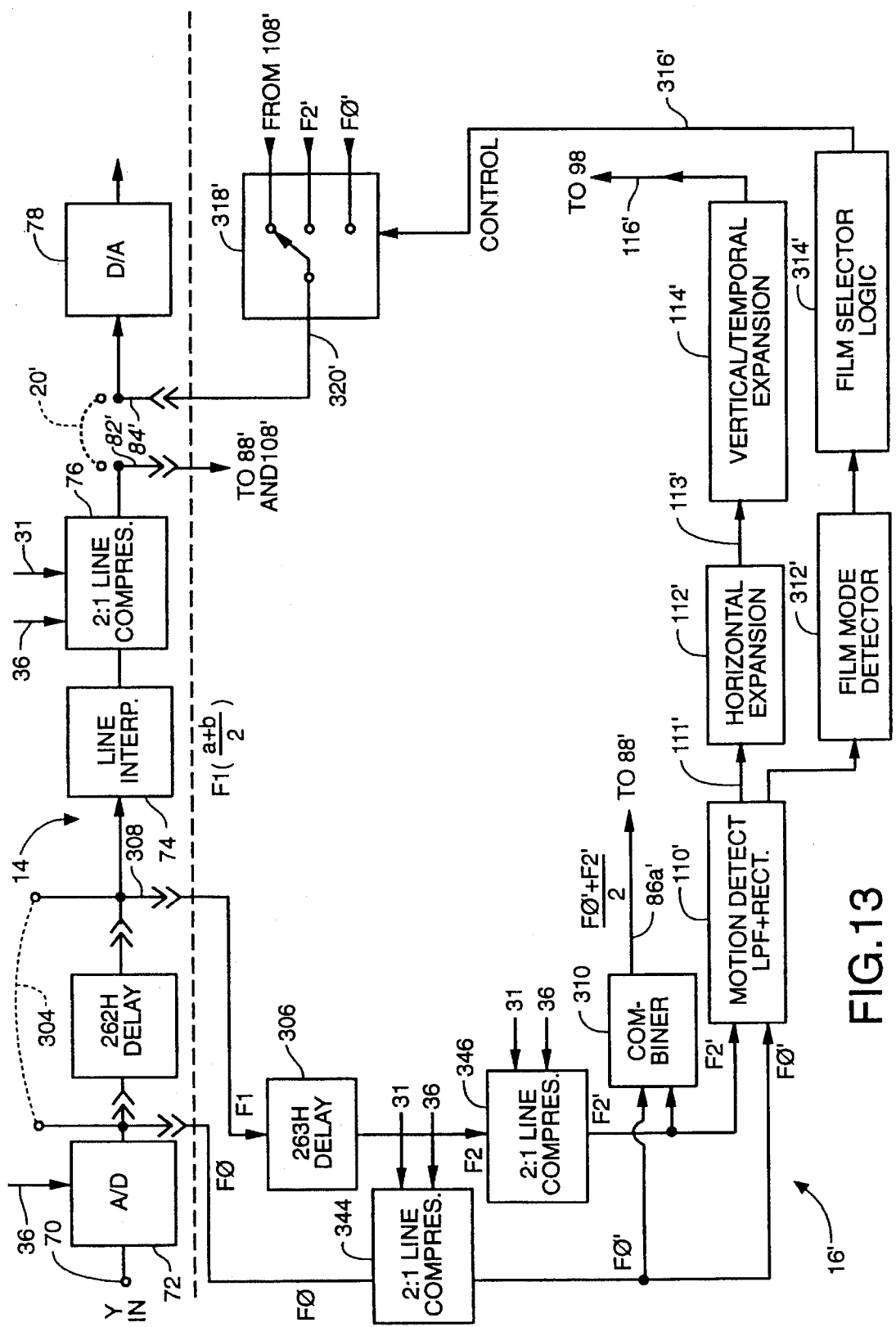
FIG. 13 is a block diagram showing a modification of the arrangement of FIG. 11 in which the optional further path insertion means is in an alternative location—between the time scale modification means and the output.

Referring now to FIG. 13, a modification of FIG. 11 is shown in which connections 82 and 84 are located between the two-to-one line compressor 76 and the digital-to-analog converter 78. The embodiment of FIG. 13 operates in generally the same manner as the embodiment of FIG. 11 except as noted. The relocated connections are labeled as 82' and 84' and the jumper is labeled as 20'. In order to accommodate the relocated further path insertion point, time scale modification means are inserted in a modified optional further path 16'. More specifically, a time scale modification means (labeled 2:1 line compressor) 344 is inserted in the F0 line from A/D converter 72 and another time scale modification means (also labeled 2:1 line compressor) 346 is inserted in the F2 line from the 263H delay 306. The time scale modification means 344 and 346 operate in the same manner as does block 76 of FIG. 1.

The time compressed F0 signal, labeled F0', and the time compressed F2 signal, labeled F2' are applied to combine 310 which provides the (F0'+F2')/2 signal on line 86a to a modified detail subtractor 88'. As in the FIG. 12 embodiment, the detail subtractor 88' is modified to accept a 2:1 time compressed signal input. The time compressed F0' and F2' signals are also applied to a modified motion detector, low pass filter and rectifier 110'. Blocks 110', 112', 114', 312' and 314' function in same way as the corresponding blocks of the FIG. 11 embodiment, except that they are modified to accept a 2:1 time compressed signal input and to run at twice the clock frequency of the corresponding blocks of FIG. 11. The interconnecting lines 111', 113', 116' and 316' are also labeled with prime marks to distinguish them from the FIG. 11 embodiment. For simplicity, blocks 88', 98' and 108' are not shown in FIG. 13. Blocks 88' and 98' are interconnected with a detail correction ALU 108' in the same manner as in FIG. 12. Blocks 88', 98' and 108' operate in the same manner as the corresponding blocks of FIG. 12, thus operating at twice the clock frequency of blocks 88, 98 and 108 of FIG. 11 as a result of the time compressed inputs applied to them. Timing and sync. circuits 18' (as in the FIG. 12 embodiment) are modified to provide the higher clock rates required.

Each of the modified elements in FIG. 13 corresponding to an element in FIG. 11 carries the same reference numeral but with a prime mark added. Because of the requirement that blocks 88', 98' and 108' operate at a higher clock frequency, the arrangement of FIG. 11 is preferred over that of FIG. 13.

To those skilled in the art to which the present invention pertains many widely differing embodiments will be suggested by the foregoing without departing from the spirit and scope of the present invention. The descriptions and disclosures herein are intended solely for purposes of illustration and should not be construed as limiting the scope of the present invention which is more particularly pointed out by the following claims.

We claim:

1. An expansible video scan converter comprising:

input means for receiving a video signal at a first scan rate, output means for providing said video signal at a second scan rate, a main signal path coupling said input means and said output means, said main signal path including
line interpolation means for interpolating pixels in original scan lines of said video signal and for putting out interpolated scan lines comprised of pixels interpolated in the spatial domain,
time scale modification means for combining original and interpolated scan lines into a video signal at the second scan rate, and first optional further path insertion means between the line interpolation means and the time scale modification means, and first removable connecting path means bypassing the first optional further path insertion means, second optional further path insertion means between the input means and the line interpolation means, second removable connecting path means bypassing the second optional further path insertion means, wherein said first and second removable connecting path means are opened, and means for selectively modifying said spatial domain interpolated pixels as a function of temporal detail in said video signal coupled to said first and second optional further path insertion means, whereby said interpolated scan lines are both spatially and temporally interpolated.

2. An expansible video scan converter comprising:

input means for receiving a video signal at a first scan rate, output means for providing said video signal at a second scan rate, a main signal path coupling said input means and said output means, said main signal path including
line interpolation means for interpolating pixels in original scan lines of said video signal and for putting out interpolated scan lines comprised of pixels interpolated in the spatial domain,
time scale modification means for combining original and interpolated scan lines into a video signal at the second scan rate, and optional further path insertion means between the time scale modification means and the output means, and removable connecting path means bypassing the optional further path insertion means, wherein the removable connecting path means is opened, and means for selectively modifying said spatial domain interpolated pixels as a function of temporal detail in said video signal coupled to said input means and to said optional further path insertion means, whereby said interpolated scan lines are both spatially and temporally interpolated.

3. An expansible video scan converter comprising:

input means for receiving a video signal at a first scan rate, output means for providing said video signal at a second scan rate, a main signal path coupling said input means and said output means, said main signal path including
line interpolation means for interpolating pixels in original scan lines of said video signal and for putting out interpolated scan lines comprised of pixels interpolated in the spatial domain,
time scale modification means for combining original and interpolated scan lines into a video signal at the second scan rate, and first optional further path insertion means between the time scale modification means and the output means, first removable connecting path means bypassing the optional further path insertion means, second optional further path insertion means between the input means and the line interpolation means, second removable connecting path means bypassing the second optional further path insertion means, wherein the first and second removable connecting path means are opened, means for selectively modifying said spatial domain interpolated pixels as a function of temporal detail in said video signal coupled to said first and second optional further path insertion means, whereby said interpolated scan lines are both spatially and temporally interpolated.

4. A converter according any one of claims 1, 2 or 3 wherein the second scan rate of the video signal provided by said output means is higher than the first scan rate of the video signal received by the input means.

5. A converter according to any one of claims 1, 2 or 3 wherein said line interpolation means interpolates pixels in accordance with the relation (A+B)/2 wherein A is a first location along a first scan line, and B is a second location along a second scan line substantially aligned vertically with the first location.

6. A converter according to any one of claims 1, 2 or 3 wherein said time scale modification means operates to provide a second scan rate which is twice the first scan rate, whereby the video signal at said second scan rate is suitable for use by a progressively scanned reproducer.

7. A converter according to any one of claims 1, 2 or 3 wherein said time scale modification means operates to provide a second scan rate which is approximately twice the first scan rate but is slightly different from twice the first scan rate, whereby the video signal at said second scan rate is suitable for use by an interlace scanned reproducer.

8. A converter according to any one of claims 1, 2 or 3 wherein said time scale modification means operates to provide a second scan rate suitable for use by computer system monitors.

9. The converter according to claim 3 wherein said means for selectively modifying said spatial domain interpolated pixels as function of temporal detail in said video signal includes field delay memory means in the signal path between the input means and the line interpolation means.

* * * * *